United States Patent Office 3,182,398
Patented May 11, 1965

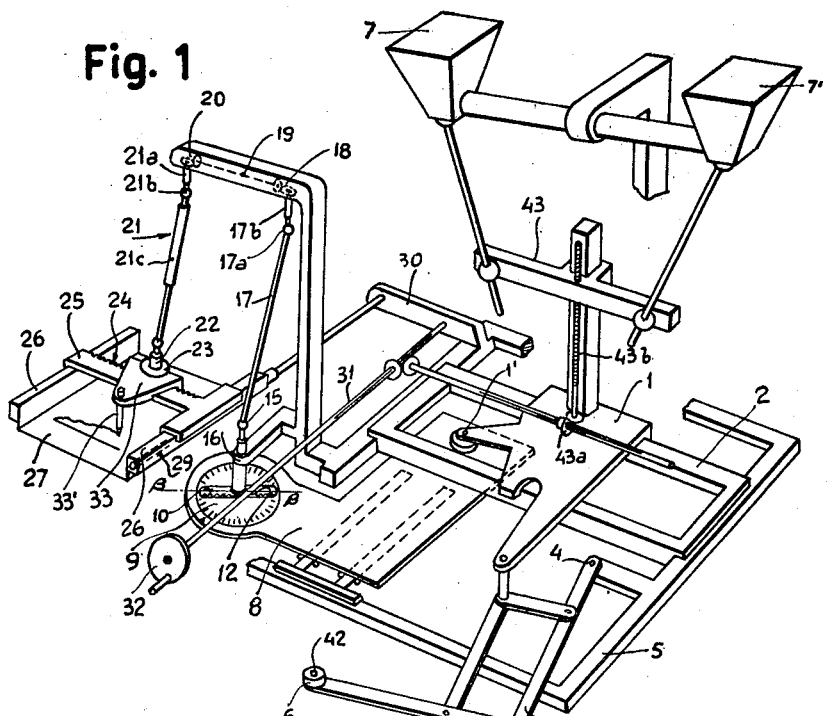

3,182,398
PANTOGRAPH OPERATED STEREO-PHOTO-GRAPHIC APPARATUS FOR PLOTTING PROFILES
Ermenegildo Santoni, Florence, Italy, assignor of one-half to Officine Galileo Societa per Azioni, Florence, Italy, a corporation of Italy
Filed Apr. 18, 1961, Ser. No. 103,759
Claims priority, application Italy, Apr. 23, 1960, Patent 629,178
9 Claims. (Cl. 33—20)

The present invention relates to photogrammetric apparatus and more particularly to apparatus for producing a drawing showing the elevation of a terrain along a predetermined vertical plane.

The movements of the elevational plotting stylus along the horizontal base line are produced by a pantograph having a manually operable control member. A rotatably mounted guide slot is oriented in the direction of the desired vertical section plane and the pantograph control member is constrained by the guide slot to move rectilinearly in the predetermined direction. As the pantograph proceeds to trace the horizontal base line, elevational readings are obtained from conventional stereoscopic photogrammetric comparator apparatus and transmitted to the plotting stylus as it progresses along the base line. The horizontal movement of the tracing element is controlled by the pantograph and the vertical movement is controlled by a handwheel which provides the coincidence between corresponding portions of the stereoscopic pair of plan view photographs as the comparator device likewise moves along the stereophotographs in the direction of the vertical section plane.

The pantograph controls the simultaneous movements of two carriages along mutually perpendicular X and Y axes. The horizontal movements of the elevational plotting stylus along the horizontal base line are controlled through suitable gearing and an electromagnetic coupling to a flat plate by the combined or resultant of the rectilinear movements of the two carriages in the direction of the guide slot. As the motion along the base line proceeds, elevational data is transmitted to the stylus by manipulation of a handwheel associated with the stereoscopic viewing apparatus.

Provision is also made for separately transmitting the individual mutually perpendicular movements of the two pantograph-controlled carriages to two similar remotely controlled carriages associated with a map table. The map table permits coordination between the photogrammetric observations and the map by reference to certain carefully measured identifiable points which are common to the photographs and to the map.

The invention will be better understood by reading the following specification with reference to the accompanying drawing forming a part hereof.

Referring to the drawing:

FIG. 1 diagrammatically illustrates in a perspective view the essential mechanisms in an embodiment of the invention;

FIG. 2 illustrates a plan view including a map table not shown in FIG. 1;

FIG. 3 is an enlarged fragmentary axial sectional view showing the guide slot member and associated structure in elevation.

According to the invention, and making a reference to FIGS. 1 and 2, 1 and 2 denote the pantograph controlled carriages, with which the stereo-plotting apparatus is provided, for the movements, respectively, in X and Y directions, said movements being imparted by the pantographic device 3 pivoted at 4 on the base 5. The operator operates said pantograph 3 by means of the knob 6 controlling in this way, the action of a stereo-scopic device (not shown) which explores the two photograms 7 and 7', the mark position forming part of the stereoscopic checking device of said photograms 7 and 7'. The same knob 6 through said carriages 1 and 2 simultaneously controls the position of the marking device on the map table 34 usually associated with the same plotting apparatus. The map table includes a nut member 35 bearing a protractor 35a provided with an alidade 35b the nut member 35 being controlled by screw 36 borne by a horizontally movable nut member 37 mounted on a transverse screw 38; the mutually perpendicular screws 36 and 38 are actuated respectively by the drives 36a and 38a through appropriate gearing or other coupling means (not shown) to repeat the movements of the carriages 1 and 2.

The carriage 1 is provided with an electromagnetic coupling device 1', controlled by the operator, and which will be hereafter described, in such a manner that a second universally horizontally movable carriage 8 is caused to follow the combined mutually perpendicular movements of the carriages 1 and 2. The secondary carriage 8 is provided with a circular directional plate 9, with an appropriately graduated azimuth scale extending around its periphery and provided with a rectilinear guide slot 10; the assembly is arranged and dimensioned in such a manner that the directional plate 9 may be rotated at will and locked in a desired position. The directional plate 9 (particularly see the section of FIG. 3) may rotate about the vertical axis A—A, being guided by a circular row of bearing balls 11 and may be locked in a desired position by the clamp 9', said clamp being fixed to the secondary carriage 8.

Furthermore, the directional plate 9 is provided with a rack 12 parallel to the axis B—B of the guide slot 10 and in such a manner as to mesh a pinion 13 connected, by means of the fixed vertical drive shaft 14, to the universal joint 15 which is thus connected, as hereinafter described, to the mechanism of the elevation drafting table.

The vertical drive shaft 14 is journaled in a fixed bracket 16 integral with the base 5 of the apparatus.

The drive mechanism constituted by the inclined shaft 17, by the universal joint 17a, by the vertical shaft 17b, by the bevel gears 18, by the horizontal shaft 19, by the bevel gears 20, by the telescopic shaft 21, with the stationary vertical shaft 21a with the universal joint 21b and the telescope length 21c, actuates, through the universal joint 22, a drive pinion 23 which meshes with a rack 24 forming part of a bridge 25; said pinion 23 engaging the rack 24 moves the plate 33, which carries the elevational plotting stylus 33'. The bridge 25 is movable on appropriate ways 26 connected to the elevational plotting table 27. The longitudinal translations of said bridge 25 on said ways 26 are actuated by a drive formed by a nut member 28, and by a screw 29, the latter being rotated through an appropriate driving connection 30 and the splined shaft 31, by a handwheel 32. The handwheel 32, while—as it has already been stated—moves the bridge 25 along the ways 26, simultaneously controls, through spiral gears 43a and vertical screw 43b, the vertical position of the bridge 43, which measures the elevation of the ground at only particular points by the usual stereoscopic methods.

The protractor 35a, provided with an alidade 35b, whose rotational motion is coaxial with the center of a map stylus, lying on the marking axis C, may also be temporarily applied to the map table 34, forming part of the stereo-plotting apparatus, and on the map, the contour lines are usually marked. Through the orientation of the alidade according to the direction S—S of the desired section, the angle α is measured, and this is the angle which the section or horizontal base line forms with the Y axis of the map table 34, corresponding to the Y axis of the instrument.

The operation of the apparatus is as follows:

After having determined the angle α formed by the desired section S, the same angle α is applied to the directional disc 9, through the appropriate scale graduation thereon; the plate 9 is then locked by the clamp 9′. Now let us suppose that the operator energizes the electromagnetic coupling member 1′ which connects the carriage 1 with the carriage 8. The carriage movements produced by the movement of the operating knob 6 (coordinates X and Y) will be restricted to a movement parallel to the guide slot 10 within which the pinion 13 rotates.

The elevational stylus 33′, which is moved by the hand wheel 32, through the bridge 25, will deliver the values of (Z) on the elevational drawing table 27, while the values or data of the horizontal coordinate of the section X′ will be imparted by the relative movement between the rack 12 and the pinion 13. In this manner, the stylus 33′ will mark the section required in an abscissa determined by the relative excursion of the pinion 13 on the rack 12 parallel to the axis B—B and to the guide slot 10, the direction being determined according to the section line S—S defined on the map table 34. It is apparent that the operator who operates the knob 6 will be compelled to allow himself to be guided rectilinearly by the action of the guide slot 10.

The coupling device 1′ preferably consists of an electromagnet which effects the mechanical connection between the carriages 1 and 8. The electromagnet 1′ is controlled by a manually operable switch 42 carried by the knob 6, the energizing circuit being conventional.

While I have shown and described what I believe to be the best embodiments of my invention, it will be apparent to those skilled in the art that various changes and modifications may be made therein without departing from the spirit and scope of the invention as defined in the appended claims.

What I claim is:

1. A plotting device of the class described, comprising: photogrammetric means for viewing a pair of stereo images, said photogrammetric means comprising a vertically and horizontally movable elevation measuring member the vertical position of which, above a predetermined level, is determined by coincidence of corresponding points of the pair of stereo images, horizontal movement of said elevation measuring member permitting the selection of the particular corresponding points in the stereo images the elevation of which is to be measured; supporting means for said elevation measuring member; a first horizontally rectilinearly movable carriage member upon which said supporting means is mounted; a second rectilinearly horizontally movable carriage member upon which said first carriage member is mounted; a base member upon which said second carriage member is mounted, the directions of movement of said first and second carriage members being mutually perpendicular; angularly adjustable guide means interconnecting said first carriage member and said base member, said guide means constraining said first and second carriage members to produce a resultant rectilinear horizontal movement of said measuring member in a predetermined direction determined by the adjustment of said guide means; an elevational plotting table with mutually perpendicular "X" and "Y" axes; a stylus movable over said table; first manually operable means for displacing said measuring member horizontally in said predetermined direction; means controlled by said first manually operable means for displacing said stylus in the direction of the X-axis of said plotting table in accordance with the horizontal displacements of said measuring member in said predetermined direction; second manually operable means for displacing said measuring member vertically; and means controlled by said second manually operable means for displacing said stylus in the direction of the Y-axis of said plotting table in accordance with the vertical displacements of said measuring member.

2. A plotting device according to claim 1, wherein said first manually operable means comprises pantograph means interconnecting said base member and said first carriage member.

3. A plotting device according to claim 1, further comprising a map table; third and fourth carriage members individually movable in the directions of the X and Y axes, respectively of said map table; means connecting said third carriage member for movement in accordance with displacements of said first carriage member; and means connecting said fourth carriage member for movement in accordance with displacements of said second carriage member.

4. A plotting device of the class described, comprising: photogrammetric means for viewing a pair of stereo images, said photogrammetric means comprising a vertically and horizontally movable elevation measuring member the vertical position of which, above a predetermined level, is determined by coincidence of corresponding points of the pair of stereo images, horizontal movement of said elevation measuring member permitting the selection of the particular corresponding points in the stereo images the elevation of which is to be measured; supporting means for said elevation measuring member; a first horizontally rectilinearly movable carriage member upon which said supporting means is mounted; a second rectilinearly horizontally movable carriage member upon which said first carriage member is mounted; a base member upon which said second carriage member is mounted, the directions of movement of said first and second carriage members being mutually perpendicular; a third universally horizontally movable carriage member supported by said base member; coupling means connecting said third carriage member for displacement along with said first carriage member; guide means carried by said third carriage member and rotatable about a vertical axis, said guide means defining a horizontally extending rectilinear guide slot the direction of which is adjustable at will; fixed follower means movable longitudinally of said slot, said slot and said follower means acting on said third carriage member to constrain said third carriage member to move rectilinearly in the direction of said slot; an elevational plotting table; a stylus movable over said table; first manually operable means for displacing said measuring member in the direction of said slot; means controlled by said first manually operable means for displacing said stylus in the direction of the X-axis of said plotting table in accordance with displacements of said measuring member in the direction of said slot; second manually operable means for displacing said measuring member vertically; and means controlled by said second manually operable means for displacing said stylus in the direction of the Y-axis of said plotting table in accordance with the vertical displacements of said measuring member.

5. A plotting device according to claim 4, wherein said coupling means comprises a manually controllable electromagnet.

6. A plotting device according to claim 4, wherein said first manually operable means comprises pantograph means interconnecting said base member and one of said carriage members.

7. A plotting device according to claim 6, wherein said one of said carriage members is said first carriage member.

8. A plotting device according to claim 4, further comprising a disc member mounted on said third carriage member for rotation about a vertical axis, said means defining said guide slot being carried by said disc member with the longitudinal axis of said guide slot intersecting said vertical axis, said follower means being carried by said base member; and means for locking said disc member in a predetermined position of rotation.

9. A plotting device according to claim 8, wherein said means controlled by said first manually operable means comprises a rack member carried by said disc member and extending longitudinally of said slot and a pinion meshing with said rack member, said pinion being revolubly supported by said base member.

References Cited by the Examiner

UNITED STATES PATENTS 1,925,207  9/33  Santoni _____ 33—20
2,797,579  7/57  Blachut et al. _____ 33—20 X

FOREIGN PATENTS 1,237,012  6/60  France.

OTHER REFERENCES

Pages 103–105, Schwidefsky, "An Outline of Photogrammetry," 1959.

ISAAC LISANN, *Primary Examiner.*

LOUIS R. PRINCE, *Examiner.*